March 29, 1966  I. D. SMITH, JR  3,243,805
ZENITH TRACKING RADAR
Filed July 30, 1963  4 Sheets-Sheet 1

INVENTOR.
IRA D. SMITH Jr.

INVENTOR.
IRA D. SMITH Jr.

March 29, 1966 I. D. SMITH, JR 3,243,805
ZENITH TRACKING RADAR
Filed July 30, 1963 4 Sheets-Sheet 3

INVENTOR.
IRA D. SMITH Jr.
BY
ATTORNEYS

INVENTOR.
IRA D. SMITH Jr.
BY
ATTORNEYS

United States Patent Office 3,243,805
Patented Mar. 29, 1966

3,243,805
ZENITH TRACKING RADAR
Ira D. Smith, Jr., West Acton, Mass., assignor to the United States of America as represented by the Secretary of the Air Force
Filed July 30, 1963, Ser. No. 298,803
5 Claims. (Cl. 343—7.4)

The invention described herein may be manufactured and used by or for the U.S. Government for governmental purposes without payment to me of any royalty thereon.

This invention relates to directional radar antennas, and in particular to an automatic tracking radar providing hemispherical coverage and whose antenna pedestal axes configuration is of the azimuth elevation type.

Hemispherical coverage cannot be accomplished with the conventional azimuth-elevation axes configuration due to the prohibitive angular velocity rates which are necessary for tracking targets which pass near the radar zenith. Complete hemispherical coverages are therefore normally attained with a three-axis configuration, and zenith coverage is normally attained with a two-axis arrangement which is something other and usually more complicated than the azimuth elevation type.

Accordingly, an object of this invention is to provide hemispherical coverage with an azimuth-elevation configuration.

The instant invention enables hemispherical coverage by an automatic radar system by providing a third axis of rotation in an azimuth-elevation configuration. This third axis of rotation is located in the antenna feed system rather than in the antenna pedestal, allowing the system to track targets which pass near the radar zenith at high angular velocities. The feed system comprises at least four-feed horns and the usual R-F hybrid assembly necessary for monopulse summing and differencing. The four-feed horns are movable on a third axis of rotation in response to error correction signals obtained when the target being tracked deviates from the azimuth and elevation pattern null points.

Other objects of my invention may be more fully understood from a careful consideration of the following detailed description when taken together with the accompanying drawings, the figures of which illustrate typical embodiments of this invention.

When a target reaches a certain point with respect to the radar which is determined by its elevation angle and slant range or perhaps angular rate, the radar pedestal automatically begins an azimuth slew in the direction of its previous azimuth angle velocity during track. As it slews in azimuth the radar continues to track in elevation and the four-feed horns radiate.

The monopulse receiver that derives the automatic tracking error data used to control the various types of movable feeds and movable reflectors used in the instant zenith tracker is of the type described in "Lobing System" by R. H. Dicke, issued Patent No. 2,830,288, disclosure of which, insofar as it relates to a receiver for monopulse summing and differencing, is incorporated herein by reference to the same extent as though it were set forth in full. However, the use of this particular receiver is meant only to be illustrative. There are numerous deviations of the monopulse technique which are applicable.

As more fully set forth in the Dicke patent as cited, an antenna system comprising a plurality of antenna elements may be so fed that together these elements produce a single directive beam for transmitting. And in receiving, the signals received by the four-horns are separated and then recombined to produce direct current directional error impulses which may be used to actuate visual directional error devices or automatic directional error corrective devices.

Figure 1:
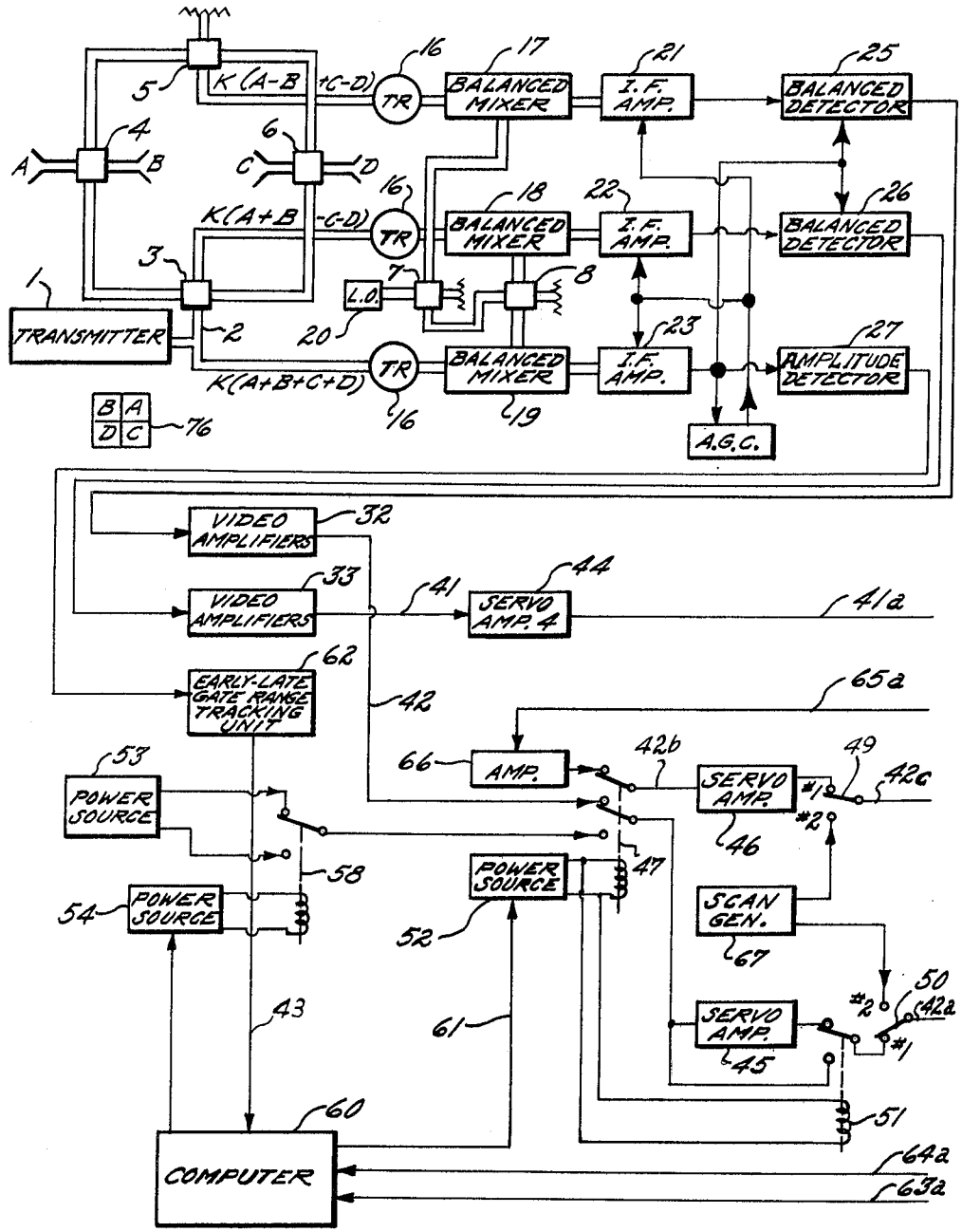
FIG. 1 illustrates the circuitry deriving the automatic tracking error data used to control the movable feed used in the instant zenith tracker.

Now referring to FIG. 1, energy generated by transmitter 1 is led through transmission line 2 to a magic tee 3. The portions of the energy received by the antenna elements A, B, C and D are separated and then recombined in magic tees 3, 4, 5, 6, 7 and 8 in a manner known to the art to produce a reference signal, $K(A+B+C+D)$, when the target lies on the antenna axis, and when the target is off-axis to produce a first directional signal, $K(A-B+C-D)$, and a second directional signal, $K(A+B-C-D)$, where K is a constant of proportionality. These signals are then passed through TR boxes 16, and then to balanced mixers 17, 18 and 19, said mixers having a common local oscillator 20, then to IF amplifiers 21, 22 and 23 and then to balanced mixers 25, 26 and 27 for the purpose of detection. The outputs of mixers 25 and 26 have a modulated direct current or video pulse and are amplified in video amplifiers 32 and 33 to provide an azimuth error signal 42 and an elevational error signal 41, respectively.

Figure 2:
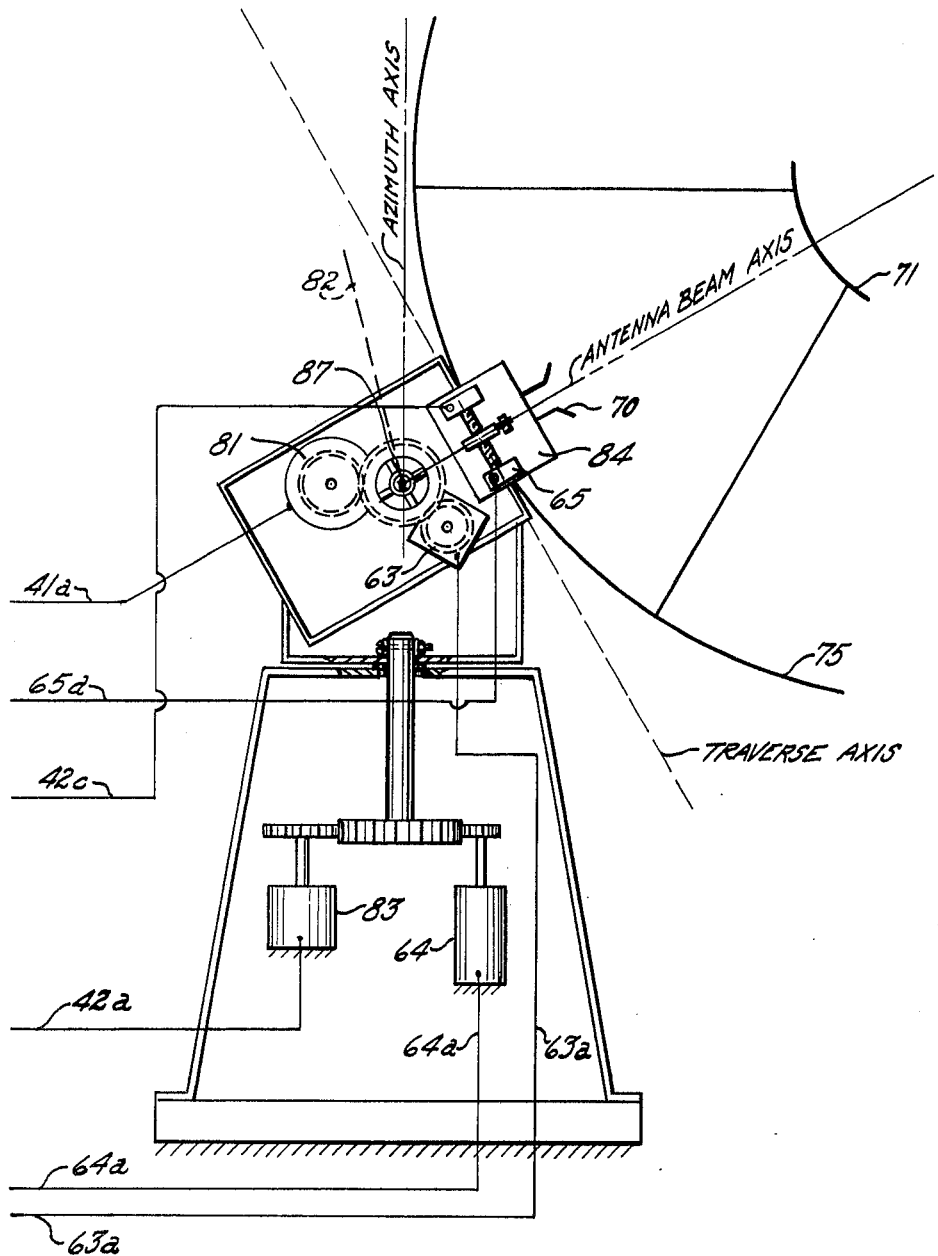
FIG. 2 illustrates one embodiment of a movable feed assembly.

By way of illustrating the point of exact novelty of the instant invention, and referring to FIGS. 1 and 2, a brief description of the normal mode of tracking is in order. Also, for a proper interpretation of FIGURE 2 it would be well to keep in mind the following definition of axes: (1) Azimuth axis—always fixed and vertical; it is perpendicular to the horizontal azimuth plane. (2) Elevation axis—always horizontal and always perpendicular to the azimuth axis; it rotates in a horizontal plane about its intersection point with the azimuth axis. The elevation axis is perpendicular to the vertical elevation plane which rotates about the azimuth axis. (3) Traverse axis—always lies in the vertical elevation plane; it is perpendicular to the traverse plane which contains the elevation axis and the beam axis. The traverse axis is vertical when the elevation angle is zero and is horizontal when the elevation angle is 90°. The traverse plane rotates about the elevation axis.

The output of amplifier 33 is elevation error signal 41 which goes to servo amplifier 44 from which output 41a goes to elevation drive motor 81 which controls elevation axis 82 of the antenna beam.

The azimuth error voltage signal 42 from the output of amplifier 32 goes through unenergized relay 47 to servo amplifier 45 and with relay 51 unenergized to lead 42a to azimuth drive motor 83 which controls the azimuth position of the antenna beam. It is to be noted that the transverse position of the antenna beam axis is coincident with the axes of parabolic reflector 75 during this normal mode of operation; it is locked into position to prevent drifting.

In the mode of zenith tracking the azimuth error voltage output 42 of amplifier 32 in FIG. 1 now becomes the transverse error voltage 42b. The control of the elevation axis rotation is identical for both the normal mode of tracking and the mode of zenith tracking.

Before the zenith tracking mode commences, the data from azimuth takeoff 64 is fed over 64a into computer 60 for determination of clockwise or counter-clockwise azimuth rate. Computer 60 then tells power source 54 to energize relay 58 when azimuth slew must be in counter-clockwise direction. Relay 58 is unenergized when azimuth slew must be in clockwise direction. Transverse error voltage 42b goes through energized relay 47 to servo amplifier 46 and wtih switch 49 at position No. 1 through lead 42c to transverse drive motor 84 which controls the transverse position of the antenna beam. Energizing of relays 47 and 51 allows power from power source 53 to slew the antenna assembly in the azimuth plane. At the beginning of the zenith tracking mode, relays 47 and 51 are automatically energized from power source 52 controlled by an azimuth slew command 61 from computer 60. Azimuth slew command 61 is generated from computations on range data 43 and elevation data 63a fed into the computer from range tracking unit 62 and the elevation data takeoff 63.

The instant when the normal mode of tracking must be resumed is automatically determined with the range and elevation data in computer 60. The actions taken in the system are in reverse to those at the beginning of the zenith tracking mode. A null control voltage 65a generated by transverse axis data take-off 65 and amplifier 66 insures that the tranverse axis is coincident with the antenna beam axis and locked in place before the normal mode of tracking resumes.

The scan mode of operation is controlled by scan generator 67 which provides the proper drive power through switches 49 and 50 in position No. 2 to the azimuth and transverse motors, 83 and 84.

Figure 3A:
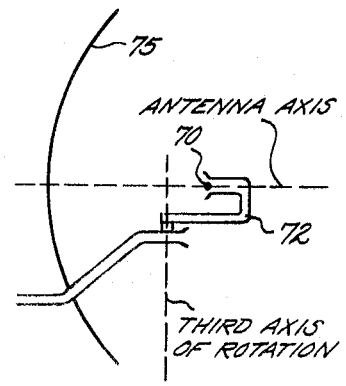
FIGS. 3a and 3b illustrate the third axis of rotation in a parabolic system and in a Cassegranian system.
Figure 3B:
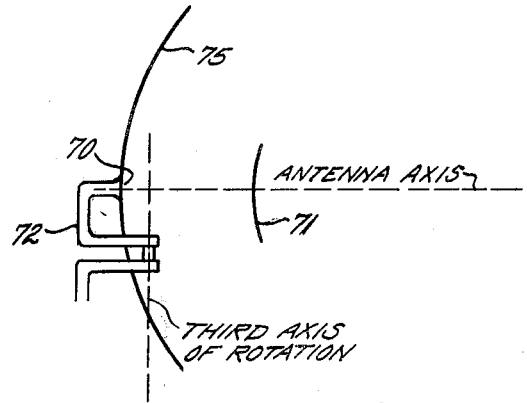

FIGURE 3a is a more detailed ilustration of movable feed 70 in FIGURE 2. Feed 70 rotates about the traverse axis which is in a vertical plane and normal to the axis of the parabolic reflector near its apex. The radius of the arc should be large enough to reasonably approximate a lateral movement. FIGURE 3b is an illustration of a movable feed for a Cassegrain system which rotates about the traverse axis which is in a vertical plane and normal to the axis of the parabolic reflector near its focal point. The single movable four-horn feed 70 requires only one rotary joint 72. The feed movement is controlled by the azimuth error voltage in a smooth fashion.

Figure 4A:
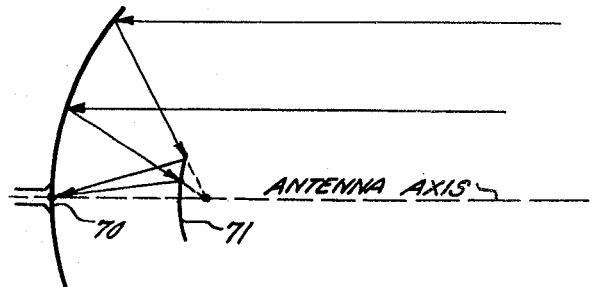
FIGS. 4a, 4b and 4c illustrate use of a sub-reflector in a Cassegranian system to provide a third axis of rotation.
Figure 4B:
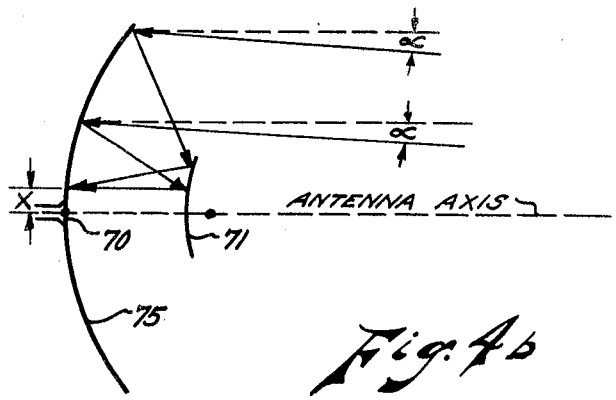
Figure 4C:
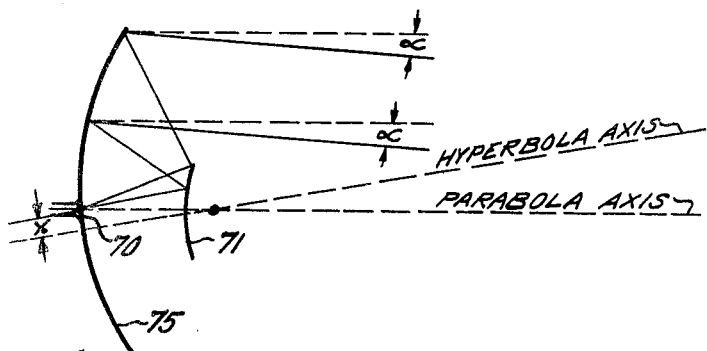

Now referring to FIGS. 4a, 4b and 4c, a third axis of rotation which is neither contained in the antenna pedestal nor in a movable feed system is one about which hyperbolic sub-reflector 71 in a Cassegrainian system rotates.

The servo drive program described in the basic invention description can also be applied here. Secondary reflector 71 is rotated about a traverse axis in a vertical plane in such a manner that the center of the off-axis focal area caused by the off-axis target always coincides with the phase center of the single group of four monopulse feed horns 70 situated near the vertex of parabolic main reflector 75. No additional rotary joints are needed with this system. Sub-reflector 71 is light enough to be rotated at high angular rates and acceleration.

In FIG. 4a, the target is on axis. Therefore, with the parabola and hyperbola axes coincident, the target response will be received by feed 70. If the target is displaced off-axis by an angle α then the target response is not received in the feed if the parabola and hyperbola axes remain coincident. As shown in FIG. 4b, the response is focused in a small area displaced a lateral distance x from the feed center.

In FIG. 4c, the hyperbola is rotated about an axis through its focal point lying in a vertical plane and orthogonal to the hyperbola axis by an amount dependent upon angle α such that the focal area of the target response moves a distance x and coincides with the phase center of the four-horn feed.

Figure 5:
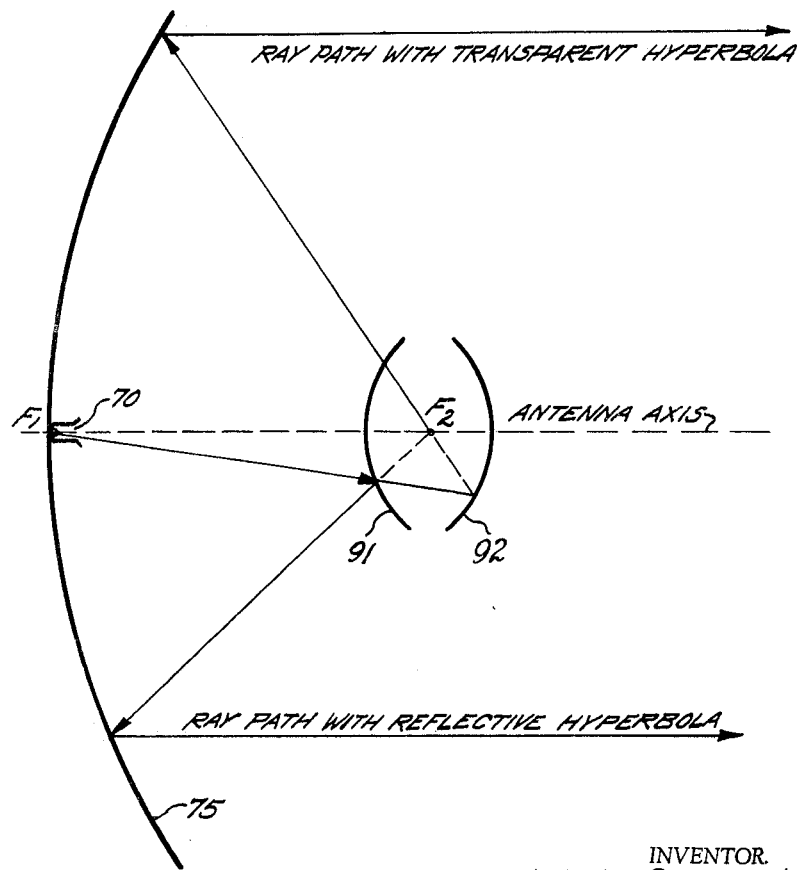
FIG. 5 illustrates use of a hyperbolic sub-reflector and an elliptical sub-reflector to provide a third axis of rotation.

FIG. 5 illustrates another method of providing in a Cassegrainian system the third axis of rotation required for zenith coverage in an azimuth-elevation type tracking antenna mount. This method employs both a hyperbolic and elliptical sub-reflectors. The third axis of rotation can be located in either of two places: hyperbolic sub-reflector 91 remains fixed and elliptical sub-reflector 92 rotates in the transverse plane, or ellipse 92 remains fixed and hyperbola 91 rotates in the transverse plane. In the first case, tracking in the zenith area is accomplished while the hyperbola is reflective and the precise tracking is accomplished while the hyperbola is transparent. Hyperbolic sub-reflector 91 is constructed such that it can be either reflective or transparent. This is done by imbedding a gridwork of very fine tubes into a hyperbolic surface constructed of radome material. When the tubes are drained, the hyperbola becomes transparent, thus allowing the ellipse 92 to become the sub-reflector.

It is to be noted that the basic concept of the above-described configurations is to perform as much of the tracking as possible with a fixed immovable reflector and use the movable reflector only when it is necessary to perform tracking near the zenith or to perform a scanning function.

It is to be understood that certain changes can be made in the above-described embodiments of the invention without departing from the scope thereof. It is intended that all matter contained in the above description, as shown in the accompanying drawings, shall be interpreted as illustrative and not in a limiting sense.

For example, a much simpler application where tracking accuracy requirements are mild relative to those of beacon trackers, is that of the missile telemetry receiver which automatically maintains a high gain antenna system on the strongest telemetry signal. These receivers are required to obtain only telemetered data and not missile trajectory data. Another application of a radar with this type of three-axes configurations is the movable feed or sub-reflector can be used during azimuth scan mode functions to remove high acceleration requirements on the main reflector drive system. This is conducive to better freedom of antenna pedestal design and longer life for moving mechanical components. Instead of stopping and starting the whole azimuth rotating assembly of the pedestal at both ends of the scan by applying large deceleration and acceleration forces in the drive system, rapid reversal of beam motion is caused by stopping and starting the azimuth rotating assembly with less accelerative forces and compensating by rotation of the small sub-reflector of a Cassegrain system about the same axis used in zenith tracking.

What is claimed is:

1. An automatic zenith tracking radar for tracking targets which pass near the radar zenith comprising: a parabolic reflector, a movable multiple-horn feed system suspended at the focal point in front of said reflector, means for moving said feed system in a traverse plane containing the antenna beam axis near the focal point of said parabolic reflector, and monopulse receiving means having an input connected to said feed system and having an output connected to said means for moving said feed system, said monopulse means deriving automatic tracking error data to control said movable feed system.

2. An automatic zenith tracking radar for tracking targets passing near the radar zenith comprising: a parabolic reflector, a secondary reflector, a single movable four-horn feed system suspended in front of said parabolic reflector at the apex of said parabolic reflector, means for moving said feed system about the traverse axis in a vertical plane and normal to the axis of the parabolic reflector near the apex of said parabolic reflector, and monopulse receiving means deriving automatic tracking error data connected to said four-horn feed system and connected to said means for moving said feed system to control said movable feed system.

3. An automatic zenith tracking radar for tracking targets passing near the radar zenith comprising: a parabolic reflector, a movable secondary reflector, a single four-horn feed system suspended in a fixed position in front of said parabolic reflector at the apex of said parabolic reflector, means for moving said secondary reflector about the traverse axis normal to the axis of the parabolic reflector near the apex of said parabolic reflector, and monopulse receiving means connected to said secondary reflector for deriving automatic tracking error data and connected to said means for moving said secondary reflector to control said secondary reflector.

4. The apparatus as described in claim 3 wherein said secondary reflector is hyperbolically-shaped, the axis of said hyperbolically-shaped reflector is coincident with the axis of said parabolic reflector, and said hyperbolically-shaped reflector is rotated about a traverse axis through its focal point by an amount proportional to the angle the target being tracked is displaced off the axis of said parabolic reflector.

5. The apparatus as described in claim 3 wherein said secondary reflector is a rotatable elliptical sub-reflector, and said tracking radar further includes a fixed hyperbolic sub-reflector being constructed to be both reflective and transparent, so that precise tracking outside of the zenith area is accomplished while the hyperbolic sub-reflector is reflective and said elliptical sub-reflector is inoperative, and tracking in the zenith area is accomplished when said hyperbolic sub-reflector is transparent and said elliptical sub-reflector is operative.

References Cited by the Examiner
UNITED STATES PATENTS

| | | | |
|---|---|---|---|
| 2,698,932 | 1/1955 | Wathen | 343—7.4 |
| 2,740,962 | 4/1956 | Hammond | 343—7.4 |
| 2,929,058 | 3/1960 | Blasberg et al. | 343—16 |
| 3,162,851 | 12/1964 | Kamen et al. | 343—7.4 X |

CHESTER L. JUSTUS, *Primary Examiner.*

THEODORE H. TUBBESING, *Assistant Examiner.*